H. O. MARTIN.
TRIPLE VALVE.
APPLICATION FILED JULY 26, 1913.
1,105,360.
Patented July 28, 1914.
2 SHEETS—SHEET 1.
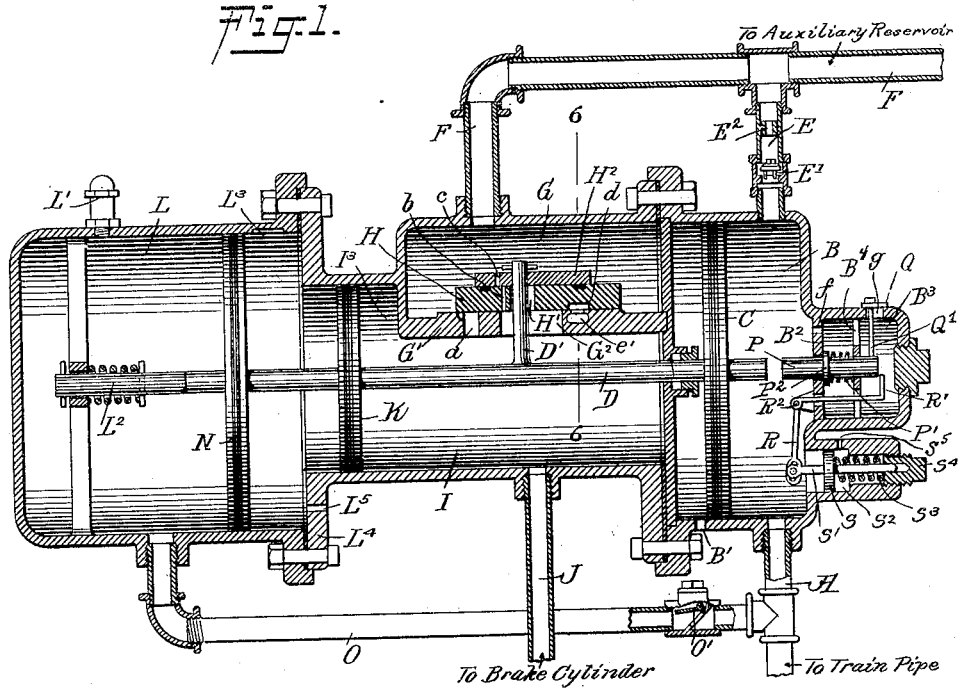
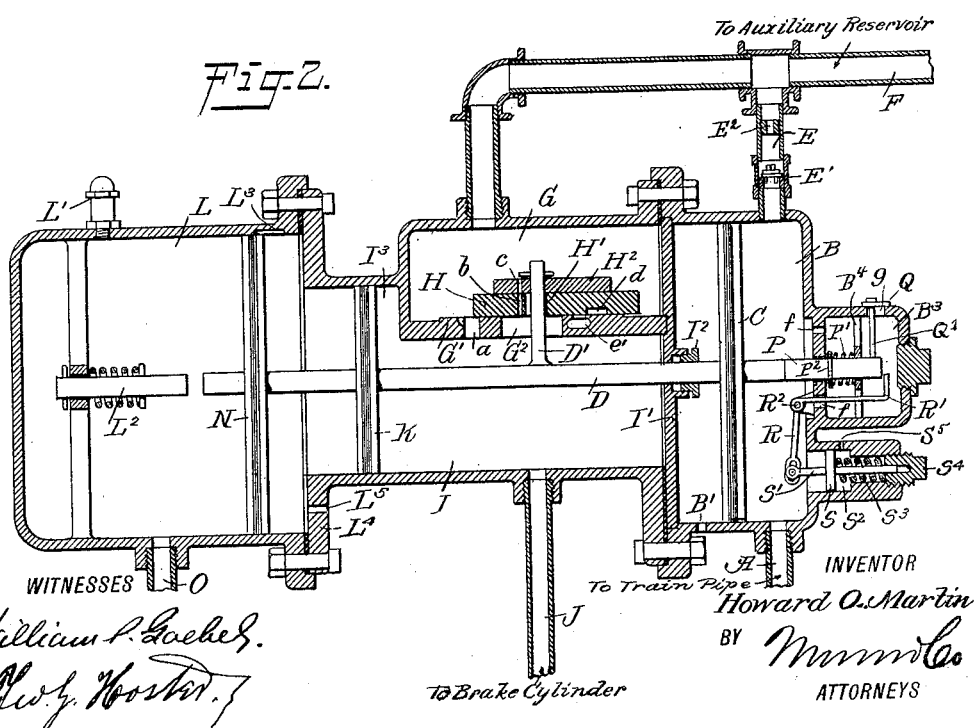
WITNESSES
INVENTOR
Howard O. Martin
BY
ATTORNEYS

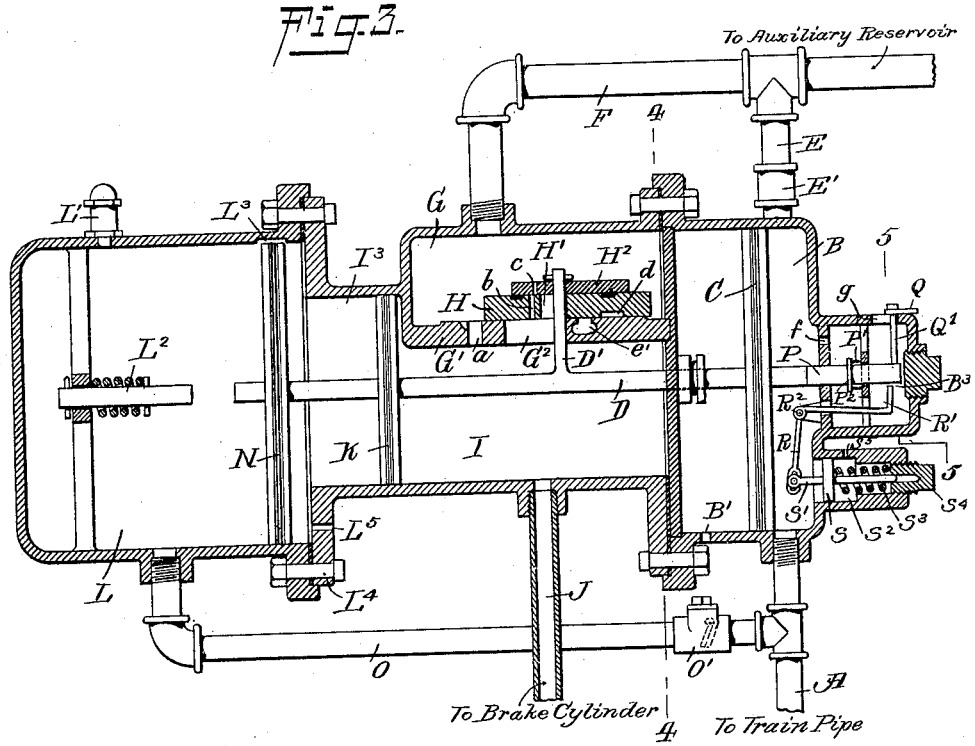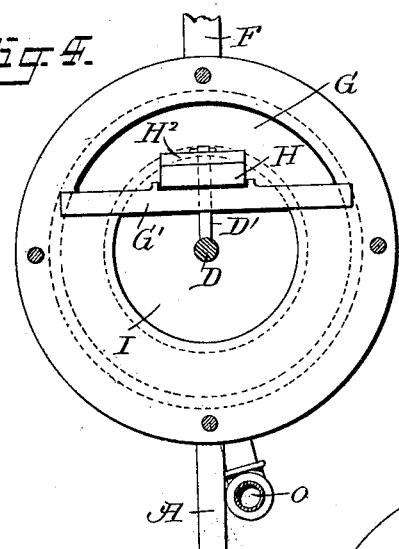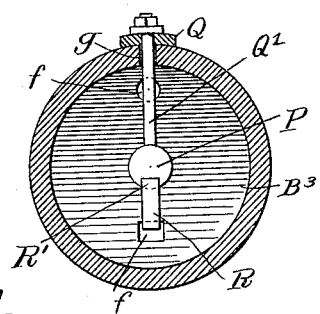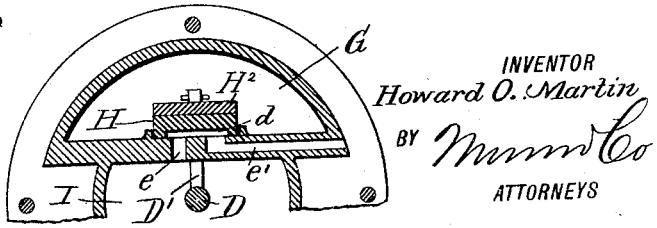

UNITED STATES PATENT OFFICE.

HOWARD OTIS MARTIN, OF CLOVIS, NEW MEXICO.

TRIPLE VALVE.

1,105,360.      Specification of Letters Patent.      Patented July 28, 1914.

Application filed July 26, 1913. Serial No. 781,352.

*To all whom it may concern:*

Be it known that I, HOWARD O. MARTIN, a citizen of the United States, and a resident of Clovis, in the county of Curry and State of New Mexico, have invented a new and Improved Triple Valve, of which the following is a full, clear, and exact description.

The invention relates to fluid pressure brakes of the Westinghouse or similar types, and its object is to provide a new and improved triple valve arranged to utilize an equalizing pressure and the combined force of the train line and brake cylinder pressure for properly controlling the triple valve and preventing uneven pressures in the brake cylinder and to prevent undesired quick action application.

In order to accomplish the desired result, use is made of equalizing pressure means, train line pressure means, brake cylinder pressure means and a slide valve controlled to move in one direction by the said equalizing pressure means and in the opposite direction by the combined force of the said train line pressure means and the said brake cylinder pressure means.

A practical embodiment of the invention is represented in the acompanying drawings forming a part of this specification, in which similar characters of reference indicate corresponding parts in all the views.

Figure 1 is a longitudinal central section of the triple valve with the parts in running position; Fig. 2 is a similar view of the same with the parts in service application position; Fig. 3 is a similar view of the same with the parts in emergency application position; Fig. 4 is a cross section of the same on the line 4—4 of Fig. 3; Fig. 5 is an enlarged cross section of the same on the line 5—5 of Fig. 3; and Fig. 6 is a cross section of the triple valve on the line 6—6 of Fig. 1.

A pipe A connects the train pipe with the outer end of a cylinder B in which reciprocates a piston C secured to a piston stem D. The left hand end of the cylinder B is provided with a port B' leading to the atmosphere, and the right hand end of the said cylinder B is connected by a branch pipe E, with a pipe F connected with the auxiliary reservoir. The pipe E is provided with a check valve E' to prevent return flow of auxiliary reservoir pressure into the cylinder on making a service or emergency application, and the pipe E is also provided with a choke plug $E^2$ to insure a gradual charging of all the auxiliary reservoirs on a train. The pipe F has an unobstructed connection with the auxiliary reservoir pressure chamber G provided on its bottom with a valve seat G' on which is mounted to slide a slide valve H controlled by a pin D' extending from the stem D, as plainly shown in the drawings. The pin D' extends through an elongated slot $G^2$ formed in the valve seat G' of the chamber G and also extends through an elongated slot H' formed in the slide valve H so that the pin D' will move a short distance prior to taking the slide valve H along. A graduating slide valve $H^2$ is mounted on top of the slide valve H and is engaged by the pin D' to move with the latter whenever a reciprocating motion is given to the stem D, as hereinafter more fully explained. The slide valve H controls a port $a$ connecting the chamber G with a brake cylinder chamber I connected by a pipe J with the brake cylinder. The slide valve H is provided with a small port $b$ opening into the slot $G^2$, and the graduating slide valve $H^2$ is provided with a small port $c$ adapted to register with the port $b$ whenever the pin D' moves from the normal position shown in Fig. 1 to the right prior to the slide valve H being moved in the same direction to uncover the port $a$. The under side of the slide valve H is provided with a cavity $d$ normally in register with ports $e$ and $e'$ formed in the valve seat G', and of which the port $e$ connects with the brake cylinder chamber I and the port $e'$ leads to the atmosphere and relieves the chamber I and the brake cylinder of pressure. The chamber I is separated from the inner end of the cylinder B by a head I' provided with a stuffing box $I^2$ in which the stem D is mounted to slide. On the stem D is secured a piston K reciprocating in a cylinder $I^3$ forming an extension on the left-hand end of the chamber I, and the left-hand end of the cylinder $I^3$ opens into the right-hand end of an equalizing cylinder L containing a piston N secured on the stem D. Thus the three pistons C, K and N are mounted on the same stem D and hence move in unison with each other. The pistons C and N are approximately of the same area and approximately two and a half times the area of the piston K.

The left hand end of the equalizing cylinder L is connected by a pipe O, containing a check valve O', with the pipe A so that the train pipe pressure can pass by way of the pipes A and O into the left-hand end of the equalizing cylinder L, to charge the latter with the standard pressure now generally used, that is 70 lbs. The equalizing cylinder L is provided with a safety valve L' set to 70 lbs. so as to prevent overcharging of the cylinder L. Within the equalizing cylinder L is mounted to slide the spring-pressed graduating stem $L^2$ in axial alinement with the stem D and adapted to be engaged by the left-hand end thereof. The right-hand end of the equalizing cylinder L is provided with a leakage groove $L^3$ adapted to connect the left-hand end of the cylinder L with the right-hand end thereof whenever the piston N moves into emergency application position, as shown in Fig. 3. The head $L^4$ of the right-hand end of the equalizing cylinder L and connecting the cylinder $I^3$ with the cylinder L is provided with a port $L^5$ leading to the atmosphere.

A stem P is mounted to slide in a wall $B^2$ having ports $f$ leading into an auxiliary chamber $B^3$ on the right-hand side of the cylinder B, the stem P also sliding in a bracket $B^4$ arranged in the chamber $B^3$. On the stem P is coiled a spring P' resting with its inner end on a collar $P^2$ formed on the pin P' and pressing at its outer end on the bracket $B^4$ to press the pin P' inward. The pin P' is provided with a stem Q' carrying an emergency valve Q controlling a port $g$ formed in the top of the auxiliary chamber $B^3$ and leading to the atmosphere. Normally the emergency valve Q is in a closed position and only moves into open position on making an emergency application, as indicated in Fig. 3. The outer end of the stem P is normally locked against outward movement by the angular end R' of a bell crank lever R fulcrumed at $R^2$ in the cylinder B and connected with the stem S' of a piston S mounted to reciprocate in a cylinder $S^2$ opening at its left-hand end into the right-hand end of the cylinder B. A spring $S^3$ is coiled on the stem S' and abuts with its inner end on the piston S and its outer end rests on a plug $S^4$ screwed into the outer end of the cylinder $S^2$ to form a guide for the right-hand end of the stem S'. The right-hand end of the cylinder $S^2$ is provided with a port $S^5$ leading to the atmosphere. It will be noticed that the piston S is exposed to train line pressure on one side and is pressed on at the opposite side by the spring $S^3$ set to say 50 lbs. of pressure, so that normally the parts are in the position shown in Figs. 1 and 2, that is, the bell crank lever R engages with its end R' the stem P to lock the same against movement to the right. The locking device just described prevents the connected pistons N, K, C, stem D and slide valve H from moving into emergency application position at the time the service application is made.

The operation is as follows: The pressure coming from the train pipe passes by way of the pipe A into the right-hand end of the cylinder B to move the piston C to the left, and the train pipe pressure also passes from the cylinder B by way of the check valve E' and pipe E into the pipe F and to the auxiliary reservoir to charge the same with the usual standard train pipe pressure. As the pipe F is unobstructedly connected with the chamber G the latter is also charged with the standard train pipe pressure, and the left-hand end of the equalizing pressure cylinder L is likewise charged with standard train line pressure of 70 lbs. Assuming that the braking system is fully charged and the several parts are in the position shown in Fig. 1, and the engineer desires to charge the brake cylinders with say 25 lbs. of pressure, then the engineer manipulates the engineer's valve so as to make a 10 lbs. reduction in the train line whereby the check valve E' is seated to prevent pressure from the auxiliary reservoir flowing back into the cylinder B and by way of the pipe A into the train pipe. Now the original charge of 70 lbs. in the equalizing cylinder L forces the piston N to the right whereby the pistons K and C and the stem D move in the same direction until the right-hand end of the stem D comes in contact with the locked stem P. During the movement of the stem D from the left to the right the pin D' carries the slide valves H and $H^2$ to the right until the left-hand edge of the slide valve H uncovers the port $a$ so that the auxiliary reservoir pressure flows by way of the port $a$, chamber I and pipe J into the brake cylinder. As the area of each of the pistons N and C is two and a half times that of piston K, it is evident that a pressure of, at least, 25 lbs. must accumulate in the chamber I in the right-hand end of the cylinder $I^3$ in order to overcome the 70 lbs. pressure in the equalizing cylinder L. When this takes place the preponderance of pressure on the piston K causes the latter and consequently the stem D and the pistons C, N to move to the left whereby the slide valves H and $H^2$ shift in a like direction to move the slide valve H back to lap position, and consequently a further supply of air to the brake cylinder is cut off. A further reduction in train pipe pressure must be made to again charge the brake cylinder with pressure whenever it is desired to do so or in case the pressure in the brake cylinder is reduced by leakage, it being understood that such subsequent reduction of pressure in the train pipe causes a preponderance of pressure in the equalizing cylinder L to move the piston N to the right and with it the stem D and its pin D' to open the slide valves H and H², as previously explained. It will be noticed that by the arrangement described the pressure in the equalizing cylinder L must overcome the combined pressure in the chamber I and cylinder B in order to move the pistons N, C and K to the right. For a very light reduction of pressure in the train pipe the piston N is only moved sufficiently to shift the graduating slide valve H² until the port $c$ moves into register with the port $b$ to allow auxiliary reservoir pressure to pass from the chamber G by way of the said ports $c$ and $b$ and the slots G² into the chamber I and from the latter by way of the pipe J to the brake cylinder.

In order to release the brakes the engineer proceeds as follows: When the engineer's valve is moved to full release or running position then the train line pressure passes into the right-hand end of the cylinder B by way of the pipe A until the standard pressure of 70 lbs. is reached, so that the combined pressure of the cylinder B and that in the chamber I exerted against the pistons C and K overcomes the pressure in the equalizing cylinder L and hence the connected pistons are moved to the left whereby a similar movement is given to the slide valve H to close the port $a$ and to finally move the cavity $d$ in register with the ports $e$ and $e'$ to allow air to pass out of the chamber I and the brake cylinder into the atmosphere (see Fig. 1).

In order to make an emergency application the engineer makes a quick heavy reduction in the train line pressure, that is, to a point below 50 lbs. to which the spring S³ is set so that the spring S³ moves the piston S to the left whereby a swinging motion is given to the bell crank lever R to unlock the stem P, and as the reduction of the pressure causes movement of the connected pistons C, K, N to the right, as previously explained, it is evident that the stem D pushes the unlocked stem P to the right so that the connected pistons practically move to the limit of their travel, and the stem P on being pushed to the right causes a similar movement of the emergency valve Q to open the latter so that pressure in the cylinder B and train line can pass by way of the port $f$ into the extension chamber B³ and out through the open port $g$ to the atmosphere so as to assist in the reduction of train line pressure. During this movement of the connected pistons to the right the slide valve H is moved to such an extent to the right that it completely uncovers the port $a$, thus allowing auxiliary reservoir pressure to pass quickly into the brake cylinder to apply the brakes. After the pressure in the cylinder B has been practically reduced to zero and auxiliary reservoir pressure and brake cylinder pressure have equalized at 50 lbs. (assuming that the auxiliary reservoir is two and a half times the size of the brake cylinder) the triple valve would not return to lap position were it not for the fact that the air in the cylinder L can pass by way of the leakage groove L³ and the port L⁵ to the atmosphere to reduce the pressure in the cylinder L sufficiently to permit the combined pressures in the cylinder B, which is zero, and the chamber I, 50 lbs., to move the parts back to lap position. The groove L³ is restricted so that several seconds elapse before the pressure in the cylinder L is reduced sufficiently to cause the triple valve to move out of emergency position.

From the foregoing it will be seen that by the arrangement described unequal piston travel and brake cylinder leakage have no effect on the braking power and the brakes can be graduated on or off at the will of the engineer. It will also be noticed that the size of the auxiliary reservoir does not affect the operation of the triple valve. The auxiliary reservoir may be ten times the size of the brake cylinders, and thus the supplementary reservoirs now used may be dispensed with if desired.

It is expressly understood that the equalizing pressure in the cylinder L is utilized to move the connected pistons and the slide valves H and H² to the right, while the combined pressures in the cylinder B and the chamber I are used to move the connected pistons and the said slide valves H and H² from the right to the left.

Having thus described my invention, I claim as new and desire to secure by Letters Patent:

1. A triple valve, comprising equalizing pressure means having a valved connection with the train pipe and provided with a cylinder and piston, a train line pressure means having an unobstructed connection with the train pipe and provided with a cylinder and piston, the said train line pressure means having a valved connection with the auxiliary reservoir, a brake cylinder pressure means located between the equalizing pressure means and the train line pressure means having an unobstructed connection with the brake cylinder and provided with a cylinder and piston, the said cylinders being in alinement, a stem extending through the alined cylinders and on which the said pistons are fixed to move in unison, an auxiliary reservoir chamber having an unobstructed connection with the auxiliary reservoir, a slide valve controlled by the said stem and controlling communication between the said auxiliary reservoir chamber and the cylinder of the said brake cylinder pressure means and a locking device for the said connected pistons to limit the movement thereof when making service applications, the locking device being controlled by pressure from the train pipe pressure cylinder.

2. A triple valve, comprising a train pipe pressure piston and cylinder having an unobstructed connection with the train pipe and a valved connection with the auxiliary reservoir to prevent return flow of auxiliary reservoir pressure into the train pipe pressure chamber, an equalizing pressure piston and cylinder having a valved connection with the train pipe to prevent return flow of equalizing pressure, an auxiliary reservoir pressure chamber having unobstructed connection with the auxiliary reservoir, a brake cylinder pressure piston and cylinder having unobstructed connection with the brake cylinder, a slide valve intermediate the auxiliary reservoir pressure chamber and the brake cylinder pressure cylinder for controlling the flow of auxiliary reservoir pressure to the brake cylinder, connected pistons reciprocating in the said train pipe pressure cylinder, the equalizing pressure cylinder and the brake cylinder pressure cylinder, the said connected pistons controlling the said slide valve, a locking device for the said connected pistons to limit the movement thereof when making service applications, the locking device being controlled by pressure from the train pipe pressure chamber, and a normally closed emergency valve adapted to connect the train pipe pressure chamber with the atmosphere and controlled by a member of the said locking device.

3. A triple valve, comprising a train pipe pressure piston and cylinder having an unobstructed connection with the train pipe and a valved connection with the auxiliary reservoir to prevent the return flow of auxiliary reservoir pressure into the train pipe pressure chamber, an equalizing pressure piston and cylinder having a valved conneection with the train pipe to prevent return flow of equalizing pressure, an auxiliary reservoir pressure chamber having unobstructed connection with the auxiliary reservoir, a brake cylinder pressure piston and cylinder having unobstructed connection with the brake cylinder, a slide valve intermediate the auxiliary reservoir pressure chamber and the brake cylinder pressure cylinder for controlling the flow of auxiliary reservoir pressure to the brake cylinder, connected pistons reciprocating in the said train pipe pressure cylinder, the equalizing pressure cylinder and the brake cylinder pressure cylinder, the said connected pistons controlling the said slide valve, a spring-pressed rod in axial alinement with the said connected pistons and adapted to be engaged by the same, a bell crank lever engaging the said rod to hold the same normally against movement to limit the movement of the connected pistons in one direction when applying the brakes, a cylinder opening into the said train pipe pressure chamber, and a spring-pressed piston in the said cylinder and connected with the said bell crank lever.

4. A triple valve, comprising a train pipe pressure piston and cylinder having an unobstructed connection with the train pipe and a valved connection with the auxiliary reservoir to prevent the return flow of auxiliary reservoir pressure into the train pipe pressure chamber, an equalizing pressure piston and cylinder having a valved connection with the pipe to prevent return flow of equalizing pressure, an auxiliary reservoir pressure chamber having unobstructed connection with the auxiliary reservoir, a brake cylinder pressure piston and cylinder having unobstructed connection with the brake cylinder, a slide valve intermediate the auxiliary reservoir pressure chamber and the brake cylinder pressure cylinder for controlling the flow of auxiliary reservoir pressure to the brake cylinder, connected pistons reciprocating in the said train pipe pressure cylinder, the equalizing pressure cylinder and the brake cylinder pressure cylinder, the said connected pistons controlling the said slide valve, a spring-pressed rod in axial alinement with the said connected pistons and adapted to be engaged by the same, a bell crank lever engaging the said rod to hold the same normally against movement to limit the movement of the connected pistons in one direction when applying the brakes, a cylinder opening into the said train pipe pressure chamber, a spring-pressed piston in the said cylinder and connected with the said bell crank lever, and a normally-closed emergency valve adapted to connect the train pipe pressure chamber with the atmosphere and carried by the said rod.

5. A triple valve provided with a slide valve and with a limiting device normally acted upon and held in locked position by train line pressure, and a spring of predetermined pressure for moving said limiting device to released position when the train line pressure is reduced below the spring pressure.

6. A triple valve including a slide valve and a cylinder having an extension cap communicating therewith and provided with a port leading to the atmosphere, a limiting device controlled by train line pressure for limiting the movement of the slide valve on service application, and an emergency valve in the cap controlling said port and connected to, and controlled by, the said limiting device.

7. A triple valve provided with a slide valve, actuating means for imparting movement to the slide valve, a spring-actuated stem normally controlled by train line pressure and limiting the movement of the said actuating means on making service application, and an emergency valve having a stem connected to and controlled by the said spring actuated stem and adapted to connect train line pressure with the atmosphere.

8. A triple valve provided with a slide valve, actuating means for imparting movement to the slide valve, a spring-pressed stem limiting the movement of the said actuating means on making service application, an emergency valve controlled by the said stem and adapted to connect train line pressure with the atmosphere, a bell crank lever normally locking the said stem against movement and holding its spring under tension, a cylinder, a piston in the said cylinder and subject at one face to train line pressure, the said piston being connected with the said bell crank lever, and a spring pressing the opposite face of the said piston.

In testimony whereof I have signed my name to this specification in the presence of two subscribing witnesses.

HOWARD OTIS MARTIN.

Witnesses:
J. R. HULL,
D. M. RODGERS.

---

Copies of this patent may be obtained for five cents each, by addressing the "Commissioner of Patents, Washington, D. C."